March 22, 1960 G. M. SCHUEDER ET AL 2,929,339

FREIGHT LOADING APPARATUS

Filed Feb. 11, 1955 7 Sheets-Sheet 1

INVENTORS.
George M. Schueder
Raymond O. Sturdy
BY Frank J. Acton
Frank H. Glomb
Harness, Dickey & Pierce
ATTORNEYS.

INVENTORS
George M. Schueder
Raymond O. Sturdy
BY Frank J. Acton
Frank A. Glomb
Harness, Dickey & Pierce
ATTORNEYS INVENTORS.
George M. Schueder
Raymond O. Sturdy
BY Frank J. Acton
Frank A. Glomb
Harness, Dickey & Pierce
ATTORNEYS March 22, 1960 G. M. SCHUEDER ET AL 2,929,339

FREIGHT LOADING APPARATUS

Filed Feb. 11, 1955 7 Sheets-Sheet 4

INVENTORS.
George M. Schueder,
Raymond O. Sturdy,
BY Frank J. Acton,
Frank A. Glomb.
Harness, Dickey & Pierce
ATTORNEYS.

FREIGHT LOADING APPARATUS

INVENTORS
George M. Schueder
Raymond O. Sturdy
BY Frank J. Acton
Frank H. Glomb
Harness, Dickey + Pierce
ATTORNEYS March 22, 1960 G. M. SCHUEDER ET AL 2,929,339

FREIGHT LOADING APPARATUS

Filed Feb. 11, 1955 7 Sheets-Sheet 6

INVENTORS
George M. Schueder
Raymond O. Sturdy
BY Frank J. Acton
Frank A. Glomb
Harness, Dickey & Pierce
ATTORNEYS.

March 22, 1960 G. M. SCHUEDER ET AL 2,929,339

FREIGHT LOADING APPARATUS

Filed Feb. 11, 1955 7 Sheets-Sheet 7

INVENTORS
George M. Schueder
Raymond O. Sturdy
BY Frank J. Acton
Frank A. Glomb

Harness, Dickey & Pierce
ATTORNEYS

Patented Mar. 22, 1960

1

2,929,339

FREIGHT LOADING APPARATUS

George M. Schueder, Dearborn, and Raymond O. Sturdy, Detroit, Mich., and Frank J. Acton and Frank A. Glomb, Park Forest, Ill., assignors to Evans Products Company, Plymouth, Mich., a corporation of Delaware Application February 11, 1955, Serial No. 487,518

16 Claims. (Cl. 105—368)

This invention is concerned broadly with the transportation of automotive vehicles by rail and relates particularly to a novel construction for a standard railway flat car which adapts the latter for efficient loading and transporting of at least six standard automobiles.

Heretofore it has been impossible for the railroads to compete economically with highway transportation of automobiles primarily because of the ever increasing size of these vehicles and the limited capacity of the standard railway car. The purpose of this invention is to provide a novel construction for a standard railway flat car which permits a single car to carry six standard automobiles. The modified construction of this invention provides a double deck for the railway car and novel means for loading automobiles on the upper deck of the car. The structure is uniquely designed to permit circus loading (i.e. loading from the ends of the car) or side loading from a dock alongside of the car. Novel ramp structures are incorporated in the car superstructure which normally support automobiles after loading and during transportation thereof, and which are movable to form a runway between the upper and lower decks of the car for loading and unloading the vehicles, and the ramps are uniquely constructed to provide the necessary flat incline which enables an automobile to be driven onto and off of the runway without dragging or scraping any part of the vehicle and also to provide the necessary head clearance for vehicles traversing the runway. At the same time the ramp structure is situated uniquely with respect to the rest of the car so as not to interfere with side loading of the automobiles onto the car. The solution to this particular problem was made particularly difficult by the low slung bodies of present day automobiles, the limited dimensions of the standard railroad flat car and the necessity of maintaining the overall height of the car as low as possible to assure proper clearance for railroad bridges, tunnels and the like. The ramps are uniquely constructed so that they form a part of the deck structures and thus do not appreciably add to the weight of the car. The entire supporting framework provides an essentially open car that can be used to carry many types of dead freight normally shipped by flat car. This assures a pay load for the car in both directions and permits efficient use of the car when not in use as an auto carrier.

In the drawings forming a part of this specification and wherein like numerals are used to designate like parts throughout the same, Figure 1 is a side elevational view showing a modified railroad flat car embodying the invention having upper and lower decks and provided with a double ramp arrangement which permits automobiles to be loaded on either deck from either end of the car and illustrating all of said ramps in a normally horizontal position;

Fig. 9 is a view similar to Fig. 8 but showing the ramps reversed to load vehicles from the opposite end of the car;

Figures 21, 22:
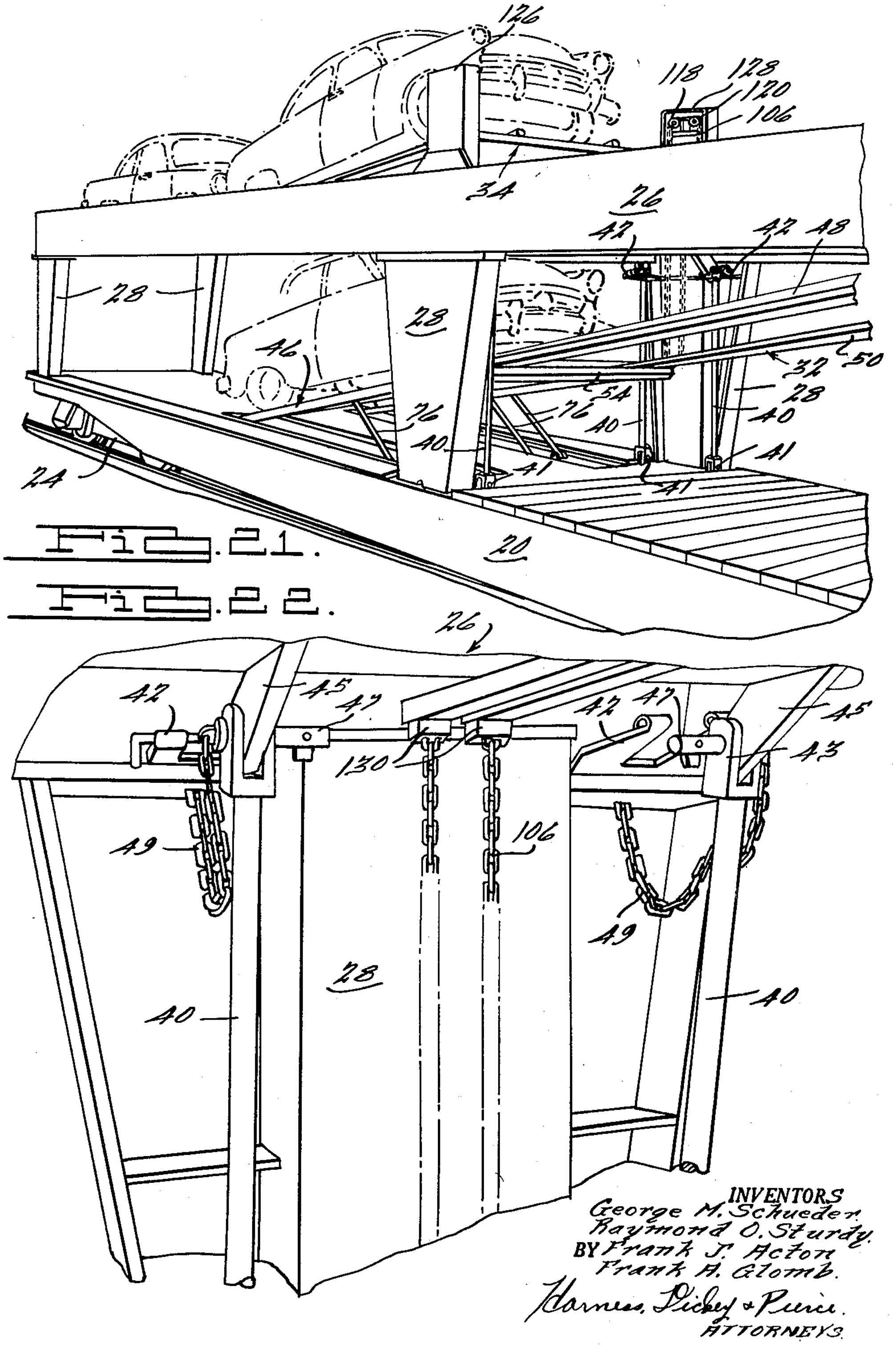

Fig. 21 is a perspective view illustrating the manner of loading the third vehicle on the car and particularly showing the position of the ramp supports when the ramps are disposed to form a runway; and Fig. 22 is a fragmentary perspective view showing the manner in which the ramp supports are attached to the ramps to sustain the weight of the vehicles on the ramps when the latter are in the horizontal position.

As suggested, the automobile carrying railroad car of this invention is made from a railroad flat car having a main frame and deck 20 and supported at opposite ends thereof in the usual manner by wheel trucks 22 and 24. The frame 20 may be provided with a conventional plank floor to support automotive vehicles thereon or it can be provided with a specially constructed metal flooring designed to support the vehicles as low as possible within the frame so as to maintain the over-all height of the structure at a minimum. In any event, the frame 20 comprises the lower deck of the car and, in order to accomplish the objects of this invention, it should be of sufficient length to accommodate three automobiles end to end.

An upper deck structure designated generally by the numeral 26 is spaced above the frame 20 and is supported on the car by suitable standards or columns 28. A separate column is provided at each corner of the car and additional columns are provided along the length of the car as required to support the upper deck structure 26. In this connection, however, it should be pointed out that the side columns 28 should be arranged so as to permit side loading of automobiles onto the lower deck 20 from a platform 30 (Fig. 13) disposed at one side of the car. We have found that middle columns 28 at opposite sides of the car and spaced from one end of the car substantially one-third the distance between the end columns 28 affords adequate support for the upper deck superstructure and at the same time provides adequate space for side loading. It is, of course, necessary in every instance to make the superstructure sufficiently strong and rigid to sustain the weight of the vehicles disposed thereon and also to withstand sidesway and weaving of the upper deck as well as jolts and impacts occurring when one car is coupled to another.

Figure 1:
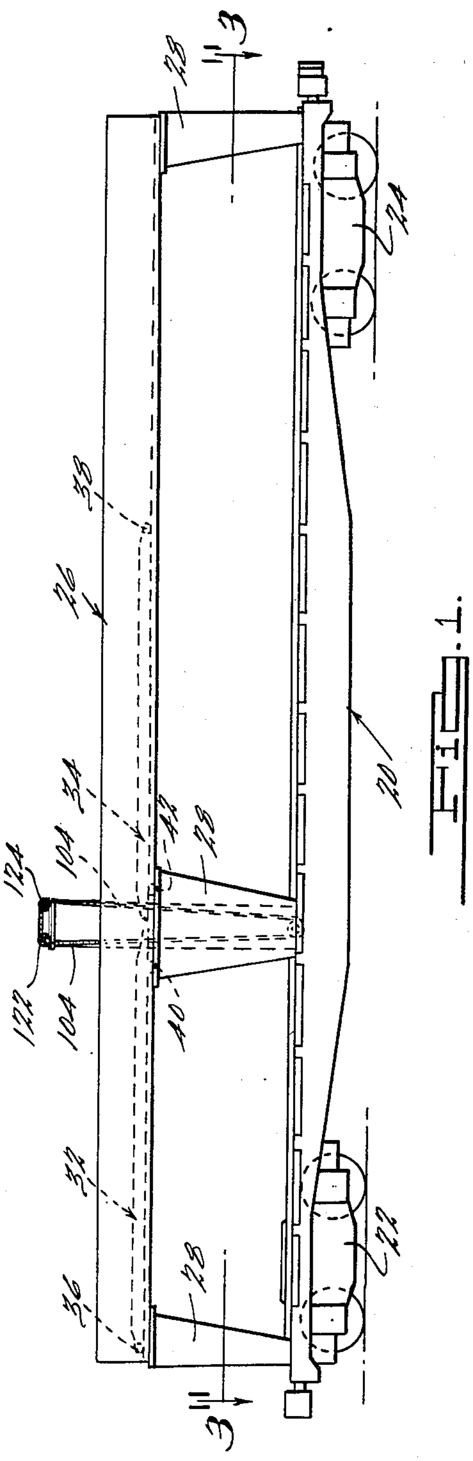

The upper deck 26 is provided with a pair of ramp structures 32 and 34 arranged end to end and normally disposed horizontally as illustrated in Figure 1. Ramp 32 extends from substantially one-third the distance from the left-hand end of the car as viewed in Figure 1 to the middle columns 28, and ramp 34 extends substantially an equal distance to the right of the middle column. Both of the ramp structures 32 and 34 are pivoted at the outer ends thereof to the superstructure at 36 and 38 respectively, and the inner or proximate ends of the ramp structures are free to swing either upwardly or downwardly about the pivots 36 and 38. The ramps 32 and 34 are never lowered at the same time. One ramp is always raised when the other is lowered, and the lowered ramp cooperates with a ramp on the lower deck 20 in a manner hereinafter described in detail to form a runway between the lower deck 20 and the upper deck 26. The ramp 32 is swung downwardly when the vehicles are loaded from the right, as viewed in the drawing, and the companion ramp 34 is swung upwardly to provide head clearance for the vehicles as they traverse the runway. Conversely, the ramp 34 is swung downwardly when the vehicles are loaded from the left, as viewed in Figure 1. When the ramp structure 34 is lowered in this manner, it is necessary to raise the ramp structure 32 to provide head clearance for vehicles traversing the runway. Suitable means, such as the props 40 at opposite sides of the car are used to support the inner or proximate ends of the ramps 32 and 34 when the latter are loaded and in a horizontal position so that under these conditions the props sustain the weight of vehicles disposed on the ramps. As perhaps best shown in Fig. 21, the props 40 are pivoted at 41 to the lower deck 20, and the props rock on the pivots 41 transversely of the car. When disengaged from the ramps, the props 40 are rocked outwardly so as not to interfere with pivotal movement of the ramps, and when thus positioned the props preferably are retained by suitable keepers 42 carried by the adjacent columns 28. When it is desired to support the ramps by the props 40, the latter are disengaged from the keepers 42 and rocked inwardly to engage clevises 43 carried thereby with flanges 45 depending from the ramp structures. Pins 47 fastened to the columns 28 by chains 49 are used to connect the props 40 to either the keepers 42 or the flanges 45.

The lower deck 20 also is provided with a pair of ramp structures 44 and 46. The two ramps 44 and 46 are similar in size and shape to the upper ramps 32 and 34, and each of the lower ramps is disposed directly under a respective one of the upper ramps. The inner ends of the lower ramps 44 and 46 are adapted to swing upwardly and to cooperate with the upper ramps to provide a runway on which the vehicles can move between the two decks.

When the upper ramp section 32 is lowered to permit loading from the right, as viewed in Figure 1, the lower ramp section 46 is raised until it is in alignment with the upper ramp. The two ramps then cooperate to provide a relatively long runway for vehicles between the upper and lower decks 20 and 26 respectively. When driving a car on this runway, however, it is necessary to raise the companion upper ramp section 34 to provide head room for the vehicle. Further, it is necessary to raise the upper ramp 34 higher than the lower ramp 46, so that it is inclined at a greater angle than the lower ramp in order to provide the necessary head clearance. Conversely, when the upper ramp 34 is lowered to permit loading from the left, as viewed in Figure 1, the lower ramp 44 is raised until the two ramps align, and the companion upper ramp 32 is raised simultaneously to provide the necessary head clearance for a vehicle traversing the ramps.

Thus, this particular ramp arrangement not only permits loading of the vehicle from either end of the car, but it provides, in each instance, a long, gradually inclined runway which is necessary to prevent dragging and scraping of the vehicle body as the latter moves onto or off of the runway. The low-slung bodies of present-day automobiles make it difficult to devise a ramp construction that is long enough to permit an automobile to be driven from the lower deck to the upper deck without dragging or scraping some part of the body, which is at the same time short enough to permit side loading of the vehicles onto the car and which affords ample head clearance for vehicles moving onto and from the upper deck. The particular ramp arrangement here shown is preeminently satisfactory in this respect. It affords an efficient use of the available space and permits the ramps themselves to be used as a part of the deck structure for supporting vehicles after loading and during transportation thereof.

The individual ramp structures are generally similar in construction. Each ramp comprises a pair of longitudinal members 48 and 50 on which the tires of the vehicles travel interconnected by cross members 52 and 54 welded or otherwise fastened thereto. In this connection it will be apparent that variations in the structure of the ramp itself are contemplated and within the scope of this invention. The important thing is that the ramp provide a pair of laterally spaced parallel members 48 and 50 on which the wheels of the vehicle travel, and that these members be suitably interconnected so that they are held in properly spaced relation and so that the entire ramp is essentially strong and rigid. Also in the case of the upper ramp structures it is desirable that the longitudinal members 48 and 50 which support the wheels of the vehicle have side flanges or equivalent means for guiding and curbing the wheels of the vehicle; however, in the case of the lower ramp structures the longitudinal members preferably are in the form of flat plates so that they provide a substantially flush deck surface when the ramps are lowered. Variations in the size and shape of the longitudinal members 48 and 50 is contemplated and within the scope of this invention. They may be interconnected by any of a number of conventional structural forms and the entire assembly may be suitably crossbraced and reinforced in any desired or conventional manner.

Figure 2:
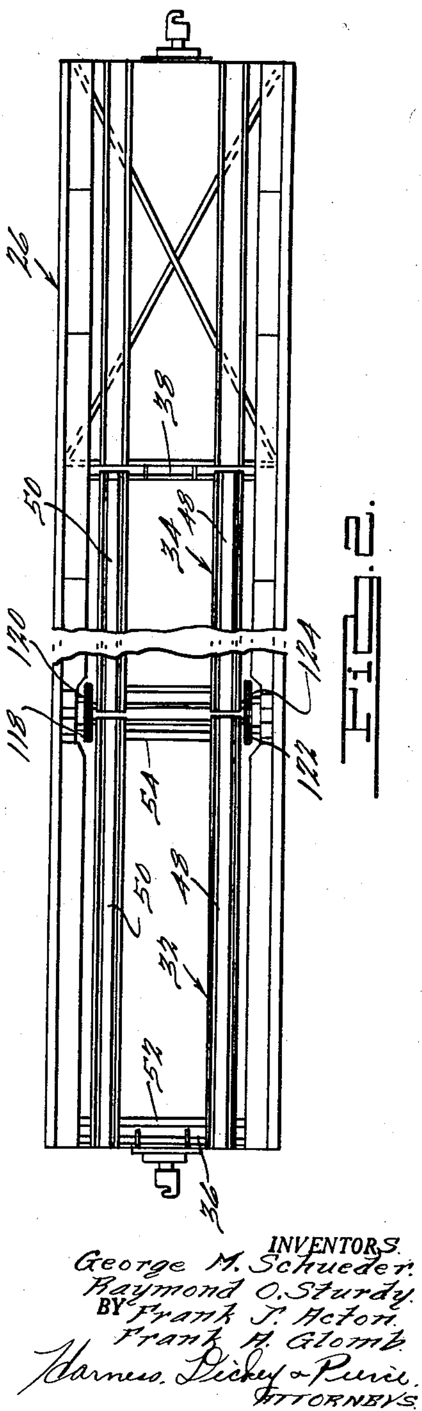
Fig. 2 is a top plan view of said car particularly illustrating the upper deck construction.

As suggested, the upper ramps 32 and 34 swing on the fixed pivots 36 and 38, and the ramps are dimensioned so that the inner or proximate ends thereof are disposed substantially in abutting engagement when the ramps are in their normally horizontal position shown in Fig. 2. The lower ramps 44 and 46, however, can not be mounted on fixed pivots in the same manner as the upper ramps because, if these ramps are merely swung angularly upwardly from their normal horizontal position, the mating ends of the cooperating ramp structures are spaced too far apart. In order to compensate for this condition each of the lower ramps 44 and 46 is mounted so that it moves longitudinally in the direction of the cooperating upper ramp at the same time that it is swung upwardly into alignment with the upper ramp. Further, the mountings for the lower ramps 44 and 46 are such that the longitudinal movement is controlled automatically to bring the inner end of the longitudinal members into substantially abutting engagement with the adjacent lower ends of the cooperating upper ramp so that two ramp sections mutually cooperate to provide a continuous way for the vehicle.

Figures 3, 4, 5, 6:
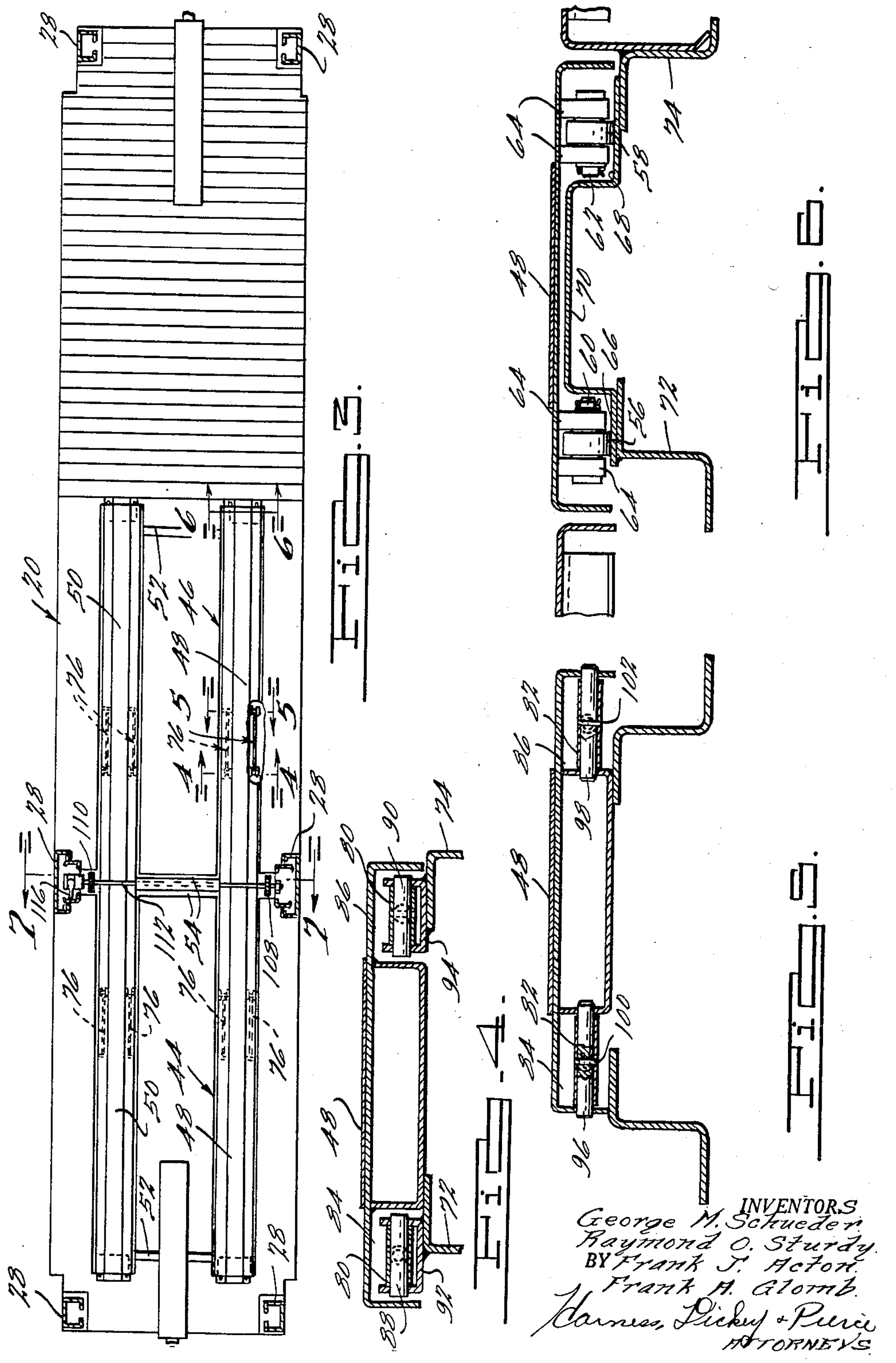
Fig. 3 is a longitudinal sectional view taken substantially on the line 3—3 of Figure 1 and illustrating particularly the lower deck of the car.
Fig. 4 is an enlarged, fragmentary, transverse sectional view taken on the line 4—4 of Fig. 3.
Fig. 5 is an enlarged, fragmentary, transverse sectional view taken on the line 5—5 of Fig. 3.
Fig. 6 is an enlarged, fragmentary, transverse sectional view taken on the line 6—6 of Fig. 3.

In this connection, it will be observed that the outer end of each longitudinal member of each of the lower ramp structures 44 and 46 is supported by a pair of rollers 56 and 58 which are journaled for rotation on pins 60 and 62 carried by mounting blocks 64 depending from the member. The rollers 56 and 58 travel on ways 66 and 68 formed in a member 70 which comprises a part of the floor structure of the lower deck 20, and the ways in turn are supported on longitudinal floor stringers 72 and 74, as shown in Fig. 6. The rollers 56 and 58 facilitate the sliding movement of the lower ramp sections longitudinally of the car.

The actual shifting of the ramp structures 44 and 46 longitudinally of the car is accomplished by rocker arms 76 disposed below and pivotally attached to the ramp. Two rocker arms 76 are here shown (Fig. 3) disposed side by side and in laterally spaced relation under each longitudinal member of each ramp. Each rocker arm 76 here shown is in the form of a tubular member 78, having transverse tubular bearing portions 80 and 82 welded thereto at opposite ends thereof. As shown in Fig. 4, the two rocker arms associated with each longitudinal member of each ramp are housed within downwardly directed channels 84 and 86 so that the arms are contained within and concealed by the members when the latter are in the normal horizontal position. The bearings 80 at the inner ends of the rocker arms are journaled on rock shafts 88 and 90, carried by supporting brackets 92 and 94 fastened to the floor stringers 72 and 74. The bearings 82 at the opposite ends of the rock shafts 76 are journaled on transverse shafts 96 and 98. The terminal portions of the shafts 96 and 98 project beyond the bearings 82 and the projecting portions thereof extend through openings in opposite sides of the channels 84 and 86. Cross pins 100 and 102 hold the shafts 96 and 98 attached securely to the bearings 82 and prevent the shafts from sliding axially in the bearings 82 and disengaging the ramps.

Figures 8, 10:
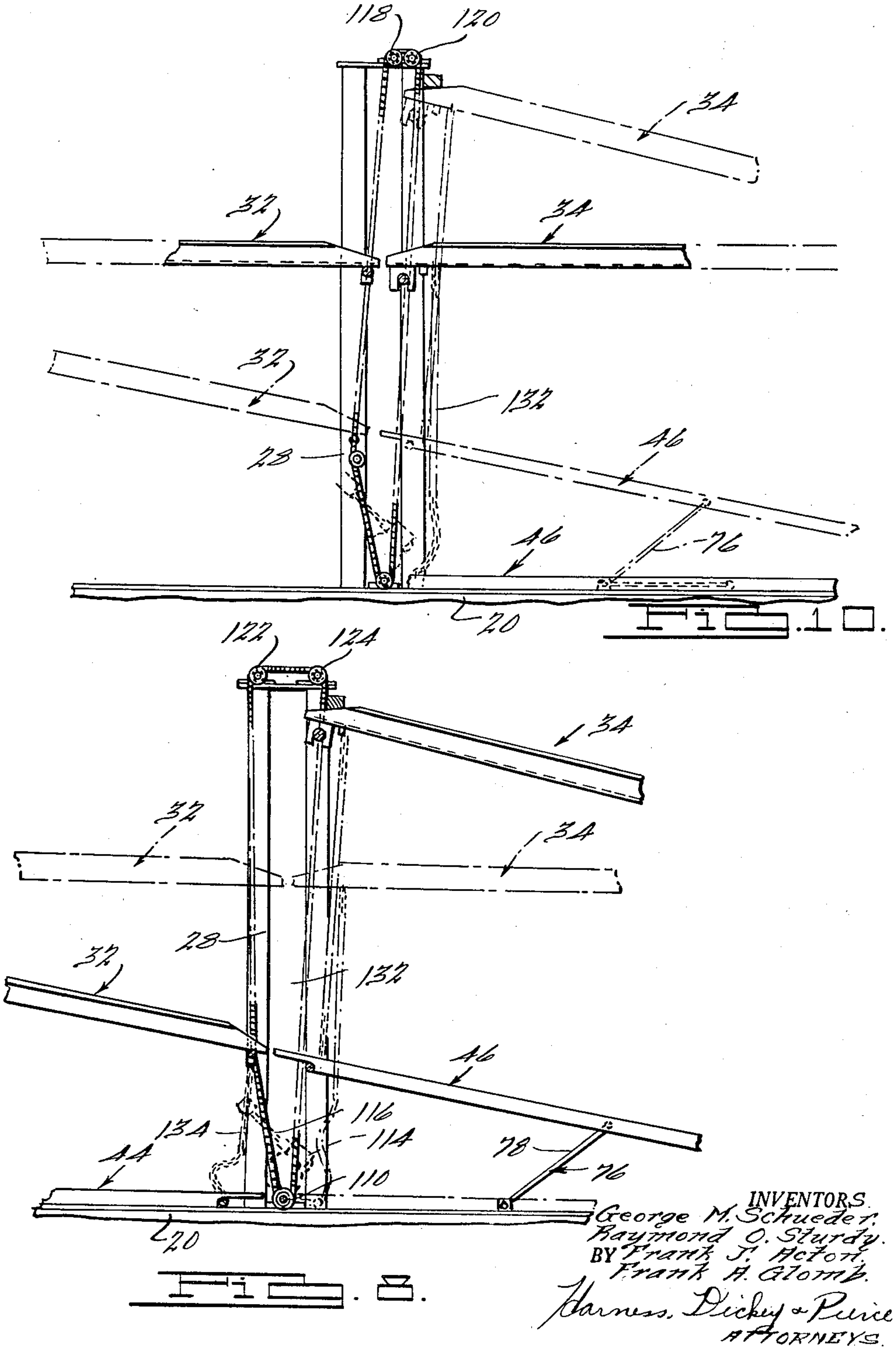
Fig. 8 is a fragmentary, vertical sectional view taken on the line 8—8 of Fig. 7 and showing the ramps disposed to load automobiles from one end of the car.
Fig. 10 is a side elevational view showing a modified single ramp arrangement embodying the invention.

As shown in Fig. 8, the rocker arms 78 extend from the floor of the car toward the outer or distal ends of the ramps 44 and 46, and when the ramps are in the normal horizontal position on the deck structure of the car, the rocker arms are disposed parallel or substantially parallel to the deck within the channels 84 and 86. When thus positioned, the inner ends of the lower ramps 44 and 46 are disposed substantially in abutting engagement, as shown in Fig. 3. However, when the inner end of either ramp is raised, in the manner hereinabove described, to provide a runway between the upper and lower deck structures of the car (Figs. 8 and 9), the rocker arms 78 swing upwardly and in the direction of the lowered end of the upper ramp to shift the entire lower ramp longitudinally and substantially into abutting engagement with the upper ramp. The lower ramp moves easily longitudinally of the car on the rollers 56 and 58.

Figure 7:
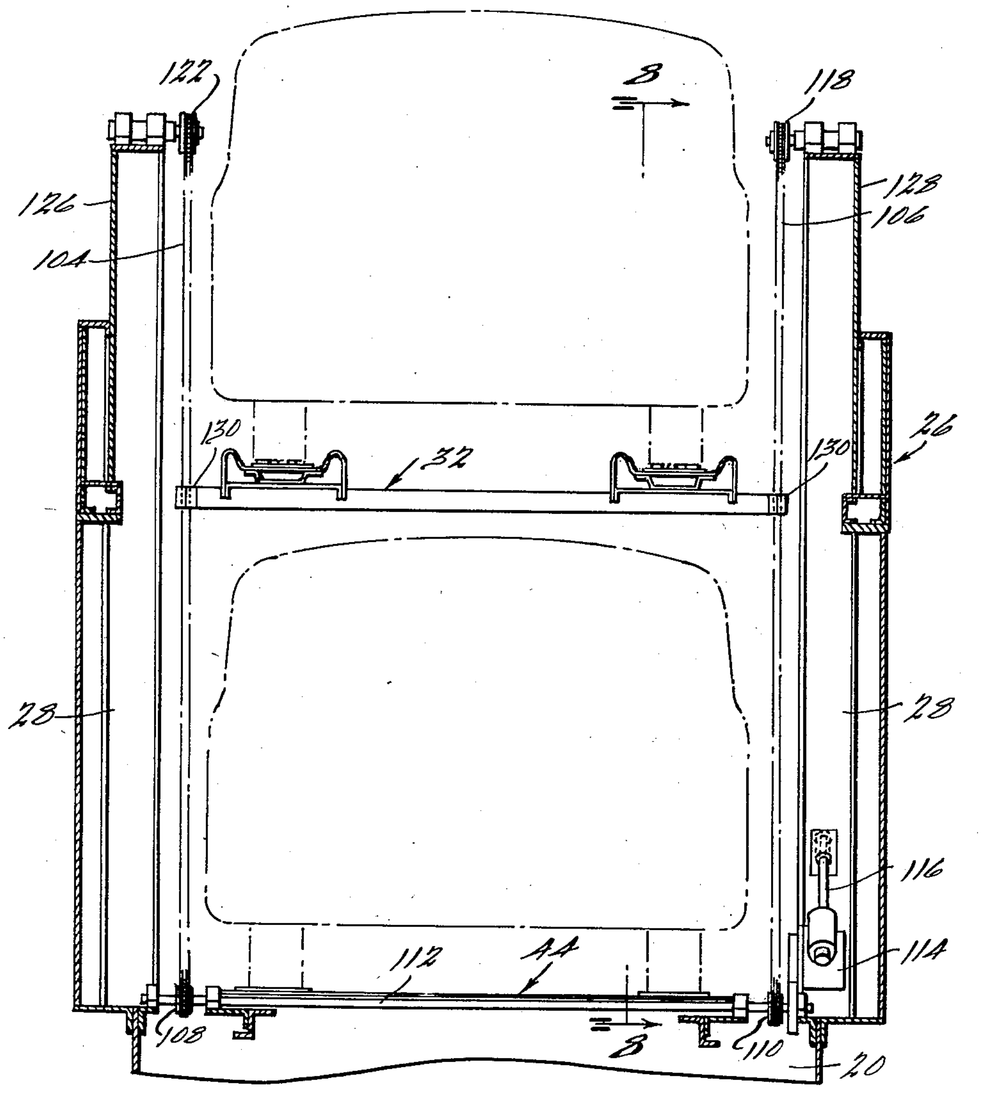
Fig. 7 is an enlarged, fragmentary, transverse sectional view taken on the line 7—7 of Fig. 3.

The drive mechanism for raising and lowering the ramps 32, 34, 44, and 46 in the manner hereinabove described includes a pair of endless chains 104 and 106 disposed vertically at opposite sides of the car. Driving sprockets 108 and 110 mounted on a common shaft 112 interengage with the lower ends of the chains 104 and 106, and the shaft is rotatably driven in either direction to drive the chains in unison by reduction gearing 114. The latter has a drive shaft 116 which is adapted either for manual actuation or for connection to any of a number of conventional power-operated drive means. If space permits, the drive shaft 112 preferably is disposed transversely under the floor of the car. Laterally spaced idler sprockets 118 and 120 engage and support the upper end of the chain 106, and idler sprockets 122 and 124 engage and support the upper end of the chain 104. The chains 104 and 106 necessarily extend substantially above the upper deck 26 in order to raise the ramps 32 and 34 sufficiently to provide the necessary head clearance for automobiles traversing the runway, and the idler sprockets 118, 120, 122, and 124 conveniently are mounted on upward extensions 126 and 128 of the center columns 28. As perhaps best shown in Figs. 7 and 21, the chains 104 and 106 extend alongside the proximate ends of the ramps, and the upper ramps 32 and 34 are fastened to the chains by conventional chain blocks 130. Drop chains 132 connected to and extending downwardly from the upper ramp 34 at opposite sides thereof are connected to the proximate end of the lower ramp 46, and drop chains 134 connected to opposite sides of the upper ramp 32 are attached to the proximate ends of the lower ramp 44.

Figure 20:
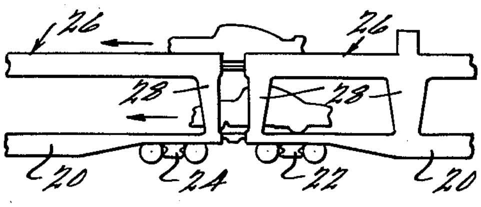
Fig. 20 illustrates a circus loading procedure for the car.

When the drive shaft 112 is rotated to move the chains 104 and 106 in a counterclockwise direction, as viewed in Fig. 8, the upper ramp 32 is lowered from the normally horizontal position shown by the broken lines to the full-line position, and the ramps 34 and 46 are raised from the broken-line to the full-line positions. Conversely, when the drive shaft 112 is rotated to move the chains 104 and 106 in a clockwise direction, ramp 34 is lowered and ramps 32 and 44 are raised. In the first instance, the ramps 32 and 46 form a runway which permits loading of the car from the right, as viewed in Fig. 1, and in the second instance the ramps form a runway which permits loading of the car from the left, as viewed in Fig. 1. In both instances, the ramps provide a relatively long, flat runway on which automobiles can be driven between the upper and lower decks without scratching or scraping any part of the vehicle. Also, ample head clearance is provided for the vehicles traversing the runway. When loading from the side of the car the ramps are always positioned as shown in Fig. 8; however, there are many situations where it is desirable to load from the left end of the car, as viewed in Fig. 1, and under these conditions the ramps are positioned as shown in Fig. 9. For example, it may be necessary or most convenient in some situations to circus load the train from one end. In the case of circus loading the automobiles are driven up ramps on the endmost car and then driven lengthwise of the train, as shown in Fig. 20, to load all the cars progressively and in succession. In other situations, as where the train extends a substantial distance down the track from a side-loading platform, it may be most expedient to side load the automobiles onto a car situated in the middle of the train beside the platform and then circus load in both directions from this car. Under these circumstances, the ramps of the cars at one side of the loading car are positioned as shown in Fig. 8, and the ramps of the car at the other side of the loading car are positioned as shown in Fig. 9. It may thus be seen that the provision of ramps which permit loading from either end of the car achieves efficient operation and permits the loading procedure to be adapted readily to the exigencies of the particular situation.

In order to assure ample headroom for the vehicles traversing the runways, the drop chains 132 and 134 preferably are longer than the distance between the ramps 32, 34, 44, and 46 when in the normally horizontal position, and the slack thus provided in the drop chains permits the upper ramp to be raised higher than the corresponding lower ramp. The upward extensions 126 and 128 of the center columns 28 are sufficiently high and the amount of slack provided in the drop chains 132 and 134 is sufficiently great to provide the necessary lift for the upper ramp required to give proper head clearance.

Figures 11, 12, 13:
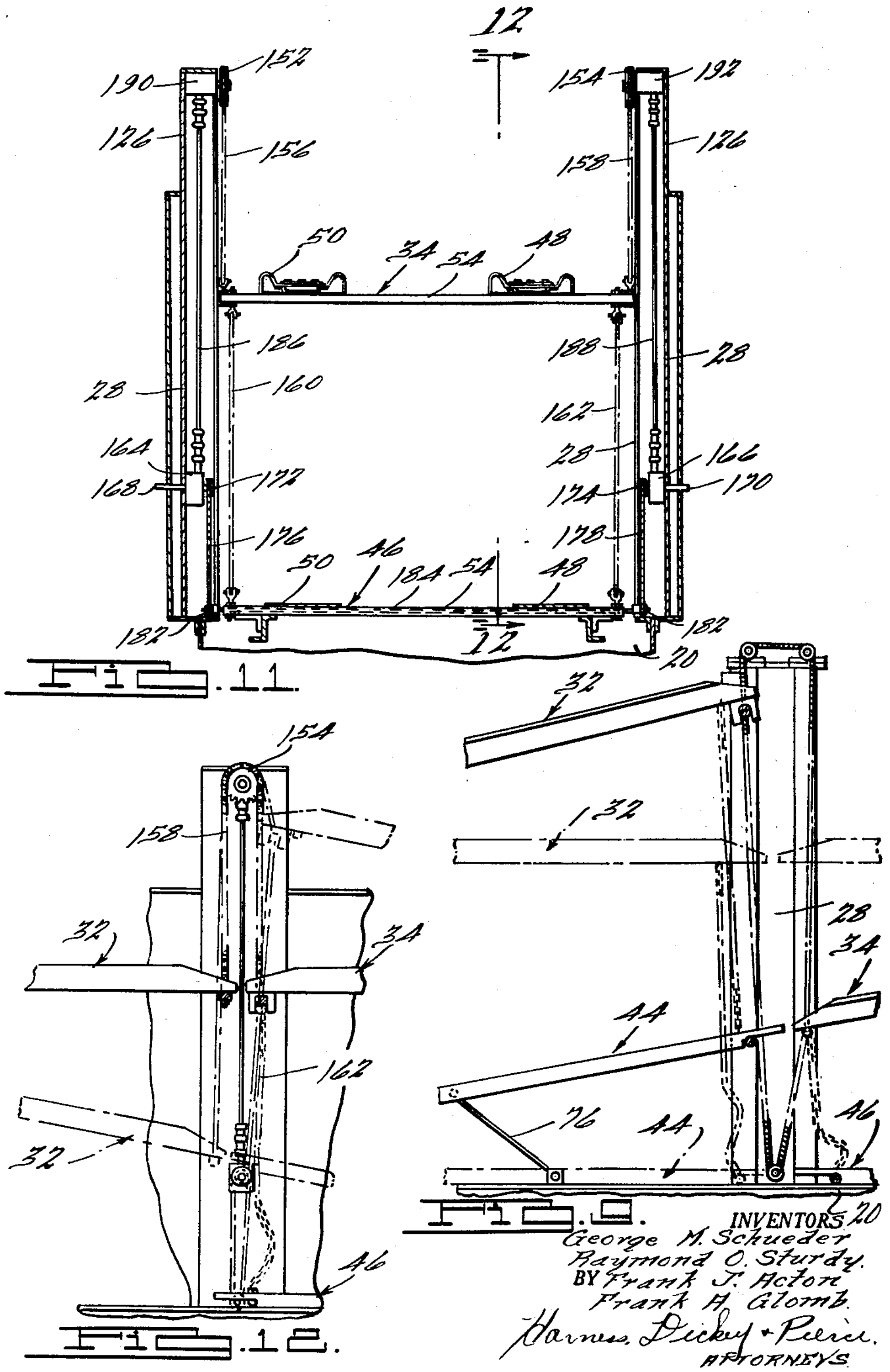
Fig. 11 is a transverse sectional view showing still another modified form of the invention and illustrating particularly a modified means for operating a single ramp arrangement of the type shown in Fig. 10.
Fig. 12 is a fragmentary, longitudinal sectional view taken on the line 12—12 of Fig. 11.
Figs. 13–18 illustrate by progressive views the manner of loading a vehicle on the upper deck of the railway car of this invention.
Figure 13:
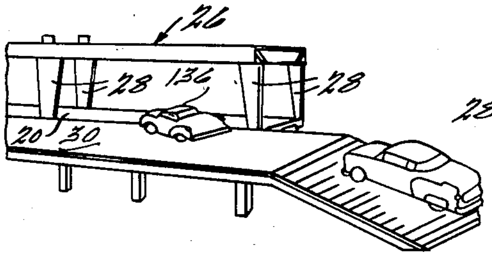
Figure 14:
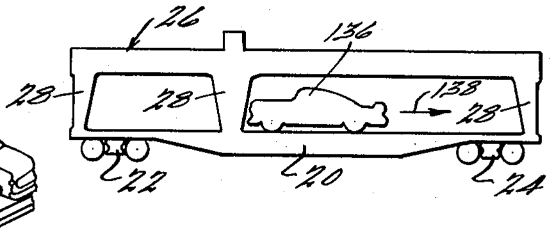
Figure 15:
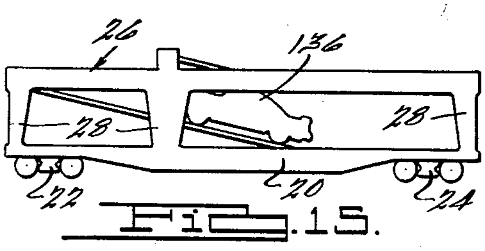
Figure 16:
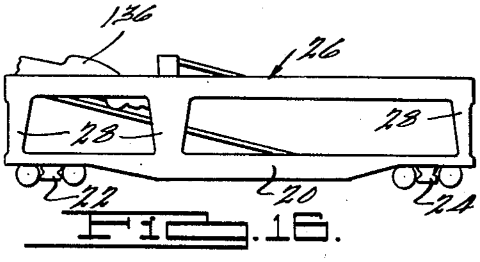
Figure 17:
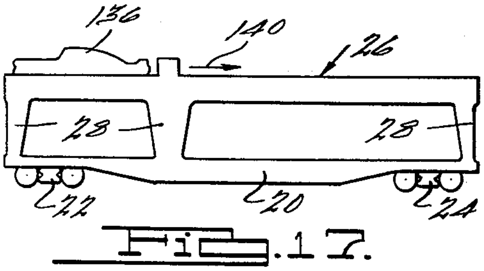
Figure 18:
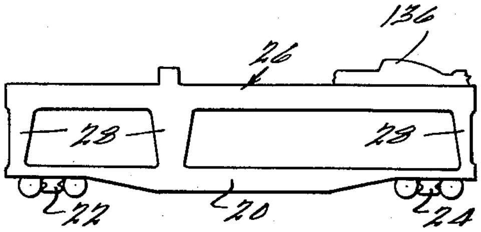

The procedure for loading the first vehicle onto the car is shown in Figs. 13–18. The first automobile 136 is driven onto the side-loading platform 30 and thence onto the lower deck of the railway car, as shown in Fig. 13. After the automobile 136 has been driven onto the lower deck 20 and advanced sufficiently to align it longitudinally with the car, it is backed as indicated by the arrow 138 toward the right hand end of the car. The ramps 32, 34, 44, and 46 are then moved to the position shown in Fig. 8 to provide a runway for the vehicle. The latter is then driven up the runway, as shown in Fig. 15, and when it reaches the top of the runway, as shown in Fig. 16, the brakes are set on the vehicle and the ramps are returned to the normally horizontal position with the vehicle on the upper ramp 32. After the ramps have been secured in the horizontal position, the vehicle is moved to the right as indicated by the arrow 140 in Fig. 17 to the position shown in Fig. 18. The vehicle 136 is then in its traveling position and is fastened securely to the car in any suitable or conventional manner as by tie-down devices of the type shown in the copending application Serial No. 490,051, filed February 23, 1955, now abandoned.

Figure 19:
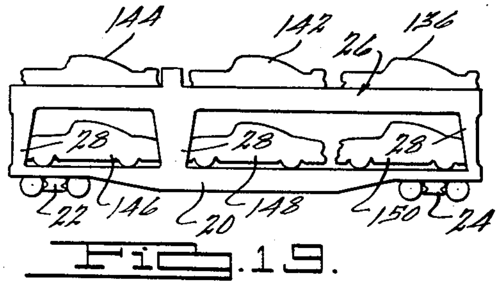
Fig. 19 is a side elevational view showing the car fully loaded.

The second auto 142 is then loaded in a similar manner to its traveling position shown in Fig. 19. In this position the vehicle 142 is supported entirely by the upper ramp 34, and it is fastened securely to this ramp in any suitable manner as by the tie-down devices hereinabove referred to.

The third automobile 144 is loaded to the position shown in Fig. 16 in the same manner as the previous vehicles 136 and 142. When the ramps are positioned as shown in Fig. 16, the previously loaded vehicle 142 is inclined upwardly with the ramp and it simply remains in this position until the third vehicle 144 reaches the top of the runway (Fig. 21). In this position, automobile 144 is supported entirely by the upper ramp 32. The ramps are then raised to move automobile 144 to the traveling position shown in Fig. 19, and the vehicle is fastened securely in place by tie-down devices or other suitable means.

Automobiles 146 and 148 are loaded in succession in the same manner as the previous vehicle, and the last automobile 150 is then loaded either from the end of the car or from the side using a wheeled dolly.

Attention is now directed to the form of the invention shown in Fig. 10 which shows a modified ramp construction adapted to provide only one runway as shown in Fig. 8. These ramps are not intended to provide a runway extending from either end of the car as does the form of the invention first described. The ramp 44 is omitted, as well as the drop chain 134. Also, under these circumstances the upper sprockets 118, 120, 122, and 124 preferably are disposed relatively close together. Otherwise the construction is the same, and corresponding parts of the two forms therefore are identified by the same reference numerals.

The function and operation of the ramps 32, 34, and 46 will be obvious from the foregoing description. The ramps are constructed, mounted and actuated similarly to the corresponding parts described in the first form of the invention.

Reference is now had to Figs. 11 and 12 which show a modified form of the drive which operates the ramp in combination with a ramp arrangement of the type illustrated in Fig. 10. In this form of the invention, the continuous chain at each side of the ramps is replaced by a length of chain as shown in the drawings. Also, the two idler pulleys at the top of the center column extensions 126 and 128 are replaced by single driving pulleys 152 and 154. Chains 156 and 158 attached at one end to the proximate end of and at opposite sides of the upper ramp 32 extend upwardly therefrom and over pulleys 152 and 154 respectively. From these pulleys the chains 156 and 158 extend downwardly and attach to the proximate end of the upper ramp 34. Chains 160 and 162 extend between and interconnect the ramps 34 and 46. The latter chains may comprise extensions of the chains 156 and 158 or they may be separate chains, as shown in the drawings. In either event, however, the chains 160 and 162 preferably have some slack when the ramps are in the normal horizontal position shown by full lines in the drawings so as to provide for ample head clearance when the ramps are operated to form a runway, as shown by broken lines in the drawing.

In this form of the invention, gear boxes 164 and 166 are mounted in the center columns 28 at a convenient height above the lower deck 20. Both gear boxes 164 and 166 are provided with drive shafts 168 and 170, respectively, adapted to receive a wrench or the like for manual operation of the drive or for connection with a suitable power-driven driving means. Also, both gear units 164 and 166 have driven sprockets 172 and 174 which are rotatably driven by the shaft 168 and 170. Chains 176 and 178 interconnect the sprockets 172 and 174 with sprockets 180 and 182 mounted on a cross shaft 184 disposed below the lower ramps 46 and 48. Extending upwardly from and also rotatably driven by the gear boxes 164 and 166 are drive shafts 186 and 188 which connect with gear boxes 190 and 192 at the upper ends of the column extensions 126. Gearing in the boxes 190 and 192 actuate the driving pulleys 152 and 154.

From the foregoing, it will be readily apparent that the chains 176 and 178 and cross shaft 184 provide a common drive for both sides of the drive mechanism and assures movement of the chains 156 and 158 in unison. A manual or mechanical drive applied to either of the shafts 168 and 170 drives both of the chains 156 and 158 in the same direction and at the same speed. Both drives act through suitable gearing provided in the gear boxes 164 and 166 to rotate the shafts 186 and 188 simultaneously, and these shafts act through gearing in the boxes 190 and 192 to drive the sprockets 152 and 154. When the sprockets 152 and 154 are driven in a counterclockwise direction, as viewed in Fig. 12, they act through the chains 156 and 158 to move the ramps 32, 34, and 46 from the full-line to the broken-line position. Contrariwise, when the sprockets 152 and 154 are driven in a clockwise direction, as viewed in Fig. 12, they act through the chains 156 and 158 to move the ramps from the broken-line to the full-line position. The ramps shown in this form of the invention function in the same manner to achieve the same result as the ramps shown in Fig. 10, and a more detailed description thereof therefore is not given.

It may thus be seen that we have achieved the objects of our invention. We have provided a railway car having a novel ramp arrangement that permits quick and efficient loading of the car and wherein the ramps serve a double function of affording a runway for moving cars between the upper and lower decks and also serve as a floor structure for supporting the cars in traveling position. In the preferred embodiment of the invention, the ramp arrangement is such that the cars can be loaded circus fashion from either end thereof or from the side and thus provides an exceedingly versatile arrangement that permits the loading operation to be adapted to substantially any condition usually encountered. In addition to the above, the ramps are uniquely constructed and arranged to provide a relatively long, gradual runway between the decks of the car and also to provide ample head clearance for driving any standard automobile on the runway. All of these features mutually co-operate to provide a novel structure for a railroad car capable of performing its intended function with maximum efficiency.

Having thus described the invention, we claim:

1. A railway flat car for carrying automotive vehicles having a floor of sufficient length to accommodate a plurality of automotive vehicles end to end and an upper deck structure, a ramp on the floor of said car extending longitudinally thereof, a pair of ramps on said upper deck structure extending longitudinally thereof and forming a portion of said deck structure, and means operatively connected to said ramps for moving said ramp and one of said upper ramps angularly into alignment with each other to provide a continuous runway for said automobiles between the floor and said upper deck and for raising the other of said upper ramps to provide head room for a vehicle traversing said runway.

2. A railway flat car for carrying automobiles having a floor of sufficient length to accommodate three automobiles end to end and an upper deck structure, a pair of ramps disposed in end to end relation on said upper deck structure, a separate ramp on said floor below one of said upper deck ramps extending longitudinally thereof and forming a portion of said deck structure, and a single drive means operatively connected to all three of said ramps operative to raise said lower ramp and one of said upper ramps angularly upwardly from said floor and said upper deck structure and simultaneously to move the other of said upper deck ramps angularly downwardly from said upper deck and into alignment with said angularly disposed lower ramp to provide a continuous runway for said automobiles between the floor and said upper deck.

3. A railway car having upper and lower deck structures each of sufficient length to accommodate at least three automobiles end to end, a pair of movable ramps normally disposed horizontally in end to end relation on said upper deck structure extending longitudinally thereof and forming a portion of said deck structure, a movable longitudinally extending ramp normally disposed horizontally on said lower deck structure under one of said upper ramps, a mechanical connection between said lower ramp and one of said upper ramps joining the same for movement in unison, and drive means connected to said upper ramps for raising the two mechanically connected ramps angularly upwardly from their respective deck structures and for moving the other of said upper deck ramps simultaneously angularly downwardly from said upper deck structure and into alignment with said angularly disposed lower ramp to provide a continuous runway for said automobiles between the floor and said upper deck.

4. A railway car having upper and lower deck structures each of sufficient length to accommodate at least three automobiles end to end, a pair of movable ramps normally disposed horizontally in end to end relation on said upper deck structure extending longitudinally thereof and forming a portion of said upper deck structure, a movable longitudinally extending ramp normally disposed horizontally on said lower deck structure under one of said upper ramps, actuator means connected to each of said ramps at one end thereof operative to raise the connected ends of said lower ramp and of one of said upper ramps so as to position the same angularly relative to said lower and upper deck structures and to lower the connected end of the other upper deck ramp to bring said other ramp into alignment with said upwardly inclined lower ramp, and means coactive with said actuator means connected to said lower ramp for moving the same longitudinally of said car substantially into abutting engagement with the lowered end of said upper ramp to provide a continuous runway for said automobiles between the floor and said upper deck.

5. A railway car having upper and lower deck structures each of sufficient length to accommodate at least three automobiles end to end, a pair of movable ramps normally disposed horizontally in end to end relation on said upper deck structure extending longitudinally thereof and forming a portion of said upper deck structure, a movable longitudinally extending ramp normally disposed horizontally on said lower deck structure under one of said upper ramps, actuator means connected to each of said ramps at one end thereof operative to raise the connected ends of said lower ramp and one of said upper ramps so as to position the same angularly relative to said lower and upper deck structures and to lower the connected end of the other upper deck ramp into alignment with the upwardly inclined lower ramp, links pivoted to said lower deck structure and to said lower ramp intermediate the ends of the latter operable by upward angular positioning of said lower ramp to shift the same longitudinally of the car substantially into abutting engagement with the lowered end of said upper ramp to provide a continuous runway for said automobiles between the floor and said upper deck.

6. A railway car having upper and lower deck structures each of sufficient length to accommodate at least three automobiles end to end, a pair of movable ramps normally disposed horizontally in end to end relation on said upper deck structure extending longitudinally thereof and forming a portion of said upper deck structure, a movable longitudinally extending ramp normally disposed horizontally on said lower deck structure under one of said upper ramps, vertically disposed continuous chains at opposite sides of said ramps connected to the adjacent ends of said upper ramps and to the corresponding end of said lower ramp, sprockets supporting said chains, means for driving said chains simultaneously operative to raise the connected ends of one of said upper ramps and of said lower ramp so that said ramps extend angularly upwardly from said deck structures and operative simultaneously to lower the connected end of the other upper ramp into alignment with the raised end of said lower ramp, whereby said aligned upper and lower ramps define a continuous runway for moving vehicles between said lower and upper decks, and whereby the raised upper ramp provides head room for vehicles traversing said runway.

7. A railway car having upper and lower deck structures each of sufficient length to accommodate at least three automobiles end to end, a pair of ramps normally disposed horioznta1ly in end to end relation on said upper deck structure extending longitudinally thereof and forming a portion of said upper deck structure and pivoted at the outer ends thereof to said deck structure, a movable longitudinally extending ramp normally disposed horizontally on said lower deck structure under one of said upper ramps, vertically disposed continuous chains at opposite sides of said ramps connected to adjacent movable ends of said upper ramps and to the corresponding end of said lower ramp, sprockets supporting said chains, means for driving said chains simultaneously operable to raise the connected ends of one of said upper ramps and of said lower ramp so that the said ramps extend angularly upwardly from said deck structures and operable simultaneously to lower the connected end of the other upper ramp into alignment with the raised end of said lower ramp, links pivoted to the lower deck structure and to the lower ramp intermediate the ends of the latter normally extending away from said chains and operable when said lower ramp is raised to move said ramp longitudinally of the car substantially into abutting engagement with the lowered end of said upper ramp to provide a continuous runway for said automobiles between the floor and said upper deck.

8. A railway car having lower and upper deck portions each of a length sufficient to accommodate at least three automobiles end to end, a pair of movable longitudinally extending ramp structures normally disposed in end to end relation on said lower deck, a pair of movable ramp structures normally disposed in end to end relation on said upper deck longitudinally thereof and forming a portion of said upper deck above corresponding lower ramp structures, and means for selectively lowering the proximate ends of said upper ramp structures and for selectively raising the proximate ends of said lower ramp structures into alignment with a one of said respective upper ramp structures when the latter is selectively lowered to provide a continuous runway for said automobiles between the floor and said upper deck.

9. A railway car having lower and upper decks each of a length sufficient to accommodate at least three automobiles end to end, a pair of movable longitudinally extending ramp structures normally disposed in an end to end relation on said lower deck, a pair of ramp structures normally disposed in end to end relation on said upper deck, extending longitudinally thereof and forming a portion of said upper deck above corresponding lower ramp structures, said upper ramp structures being pivotally attached at the outer ends thereof to said upper deck, means for swinging the proximate ends of said upper ramp structures simultaneously in opposite directions so that one of said ramp structures is inclined upwardly from the upper deck structure while the other ramp structure is inclined downwardly therefrom, and means for selectively raising the proximate ends of said lower ramp structures so that the raised ramp structure is inclined upwardly from said lower deck, whereby either of said lower ramp structures can be moved angularly into alignment with its oposite upper ramp structure when the latter is lowered from its upper deck to provide a continuous runway for vehicles between the upper and lower decks of said car.

10. A railway car having lower and upper deck portions each of a length sufficient to accommodate at least three automotive vehicles end to end, a pair of movable longitudinally extending ramp structures normally disposed in an end to end relation on said lower deck, a pair of movable ramp structures normally disposed in end to end relation on said upper deck extending longitudinally thereof and forming a portion of said upper deck above corresponding lower ramp structures, actuators connected to the proximate ends of said upper ramps operative to move the same simultaneously vertically in opposite directions so that one of said ramps is inclined upwardly from said upper deck and the other of the upper ramps is inclined downwardly therefrom, and means interconnecting each of said upper ramps with its corresponding lower ramp operable to raise each individual lower ramp when the corresponding upper ramp is raised, whereby lowering of either upper ramp structure from said upper deck automatically moves the opposite lower ramp structure angularly into alignment therewith to provide a continuous runway for automotive vehicles between said decks.

11. A railway car having lower and upper deck portions each of a length sufficient to accommodate at least three automotive vehicles end to end, a pair of movable longitudinally extending ramps normally disposed in an end to end relation on said lower deck, a pair of movable ramps normally disposed in end to end relation on said upper deck extending longitudinally thereof and forming a portion of said upper deck above corresponding lower ramps, actuators connected to the proximate ends of said upper ramps operative to move said ends simultaneously vertically in opposite directions so that one of said ramps is inclined upwardly from said upper deck and the other of said ramps is inclined downwardly therefrom, means interconnecting each of said upper ramps with its corresponding lower ramp operable to raise the lower ramps individually when the corresponding upper ramp is raised, whereby lowering of either upper ramp from said upper deck automatically moves the opposite lower ramp angularly into alignment therewith to provide a continuous runway for automotive vehicles between said decks, and means connected to each of said lower ramps rendered operative by upward movement thereof to shift the same longitudinally of the car in a direction to bring the raised end thereof substantially into abutting engagement with the lowered end of the opposite upper ramp.

12. A railway car having lower and upper decks each of a length sufficient to accommodate at least three automotive vehicles end to end, a pair of movable longitudinally extending ramps normally disposed in an end to end relation on said lower deck, a pair of movable ramps normally disposed in end to end relation on said upper deck extending longitudinally thereof and forming a portion of said upper deck above coresponding lower ramps, vertically disposed endless chains at opposite sides of said car connected to the proximate ends of said upper ramps, sprockets at the ends of said chains supporting the same for movement on said sprockets, means connected to said sprockets for driving said chains simultaneously in the same direction, and flexible means connecting the proximate end of each upper ramp with the proximate end of the corresponding lower ramp, whereby rotation of said chains in either direction raises one of said upper ramps and lowers the other of said upper ramps and simultaneously raises the lower ramp opposite said lowered upper ramp into alignment with the latter to provide a continuous runway for vehicles between said lower and upper decks.

13. A railway car having lower and upper deck portions each of a length sufficient to accommodate at least three automotive vehicles end to end, a pair of movable longitudinally extending ramps normally disposed in an end to end relation on said lower lower deck, a pair of movable ramps normally disposed in end to end relation on said upper deck extending longitudinally thereof and forming a portion of said upper deck above corresponding lower ramps, vertically disposed endless chains at opposite sides of said car conected to the proximate ends of said upper ramps, sprockets supporting said chains, means connected to said sprockets for driving said chains simultaneously in the same direction, flexible means connecting the proximate end of each upper ramp with the proximate end of the corresponding lower ramp, whereby movement of said chains in either direction raises one of said upper ramps and lowers the other of said upper ramps and simultaneously raises the lower ramp opposite the lowered upper ramp into alignment with the latter to provide a continuous runway for vehicles between said lower and upper decks, and means connected to said lower ramps rendered operative when the latter are raised from said lower deck to shift each individual ramp longitudinally in a direction to bring the raised end thereof substantially into abutting engagement with the lowered end of the cooperating upper ramp.

14. A railway car having upper and lower decks each of sufficient length to accommodate at least three automobiles end to end, a pair of ramps disposed end to end on said upper deck extending longitudinally thereof and forming a portion of said upper deck, one of said ramps being mounted to permit the proximate end thereof to swing upwardly from said upper deck and the other being mounted to permit the proximate end thereof to swing downwardly from said upper deck, a longitudinally extending ramp on said lower deck directly below said upwardly swingable upper ramp, driving sprockets at opposite sides of said upper deck, chains extending over and interengaging said sprockets connected to the proximate ends of said ramps, and means for rotatably driving said sprockets to move said chains simultaneously in the same direction, said drive means being operable to raise said lower ramp structure angularly upwardly from said lower deck and simultaneously to swing the opposite upper ramp structure downwardly into alignment therewith to provide a continuous runway for vehicles between said lower and upper decks and also operable simultaneously to raise the other of said upper ramps to provide head room for a vehicle traversing said runway.

15. In a railroad vehicle for hauling automobiles, a standard flat car having a floor of sufficient length to accommodate a plurality of standard size automobiles end to end, an upright column rigidly secured to the flat car at each of the four corners thereof, at least one intermediate upright column secured to the flat car on each side thereof at an intermediate point along the length of the car, the space between said intermediate columns and the columns at one end of the car being open and comprising an entrance for automobiles to be driven on to said floor from the sides of the car, a longitudinally extending upper deck for automobiles supported on said columns and substantially coextensive with said floor, and means providing cooperating movable ramps on said upper deck and said floor movable into angular alignment to provide a continuous runway for driving automobiles from said floor up to and on said upper deck.

16. A railway flat car for carrying automobiles having a floor of sufficient length to accommodate a plurality of standard size automobiles end to end and an upper deck structure, a lower longitudinally extending lower ramp on said floor, an upper ramp on said upper deck structure extending longitudinally thereof and forming a portion of said upper deck structure offset longitudinally of the car from said lower ramp, means mounting said lower ramp for tilting upwardly so that an end thereof reaches a position intermediate said floor and upper deck, means mounting said upper ramp for tilting downwardly so that an end thereof reaches said position and is in alignment with and an extension of said lower ramp to provide a continuous runway for said automobiles between the floor and said upper deck structure, and means operatively connected to said ramps for moving said ramps to and from said position.

References Cited in the file of this patent

UNITED STATES PATENTS

| | | |
|---|---|---|
| 1,994,695 | Dolan et al. | Mar. 19, 1935 |
| 2,004,439 | Judd | June 11, 1935 |
| 2,127,965 | Strid et al. | Aug. 23, 1938 |
| 2,146,203 | Demarest | Feb. 7, 1939 |
| 2,147,014 | Demarest | Feb. 14, 1939 |
| 2,233,055 | Kennedy | Feb. 5, 1941 |
| 2,647,009 | Huebshman | July 28, 1953 |
| 2,659,318 | Steins et al. | Nov. 15, 1953 |
| 2,668,734 | Bridge | Feb. 9, 1954 |
| 2,695,568 | Keith | Nov. 30, 1954 |
| 2,758,552 | Browne | Aug. 14, 1956 |

FOREIGN PATENTS

| | | |
|---|---|---|
| 295,736 | Great Britain | Aug. 20, 1928 |